Dec. 11, 1962     C. H. ELLABY     3,067,914
STORAGE VESSEL CONSTRUCTION
Filed Sept. 14, 1959     3 Sheets-Sheet 1

INVENTOR.
CHARLES H. ELLABY
BY
ATTORNEY

Dec. 11, 1962 C. H. ELLABY 3,067,914
STORAGE VESSEL CONSTRUCTION
Filed Sept. 14, 1959 3 Sheets-Sheet 2
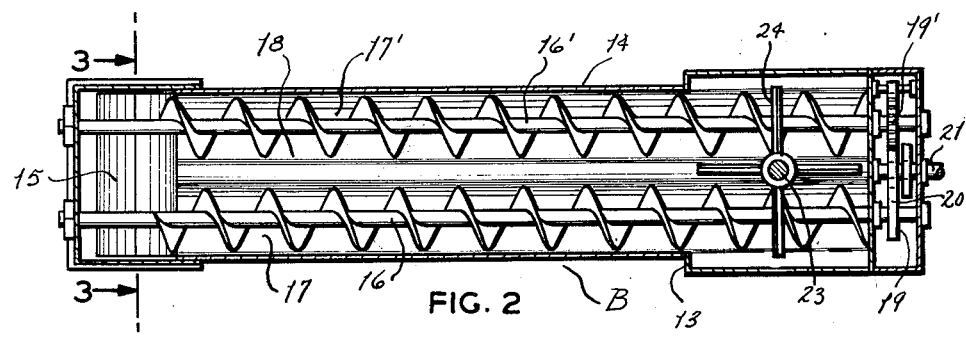
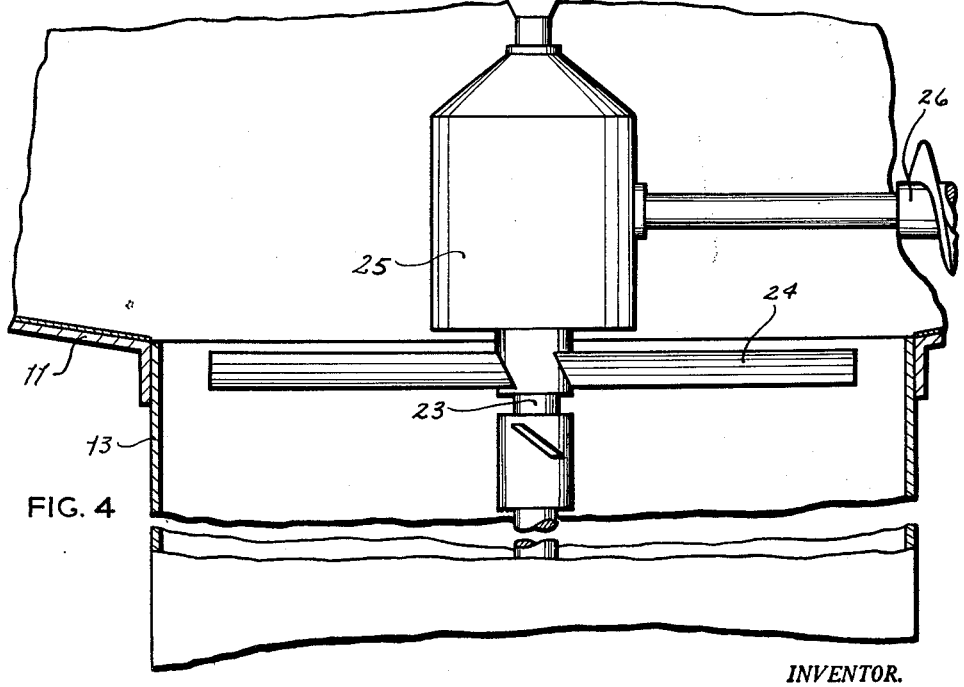
INVENTOR.
CHARLES H. ELLABY
BY
ATTORNEY Dec. 11, 1962 C. H. ELLABY 3,067,914
STORAGE VESSEL CONSTRUCTION
Filed Sept. 14, 1959 3 Sheets-Sheet 3

*INVENTOR.*
CHARLES H. ELLABY
BY
ATTORNEY

United States Patent Office 3,067,914
Patented Dec. 11, 1962

3,067,914
STORAGE VESSEL CONSTRUCTION
Charles H. Ellaby, 10 Bon Price Terrace, Olivette, Mo.
Filed Sept. 14, 1959, Ser. No. 839,635
2 Claims. (Cl. 222—227)

This invention relates in general to material storage and, more particularly, to certain new and useful improvements in storage vessel construction.

During the storage of various materials, such as agricultural products, which deteriorate in an atmosphere of air the same tend to cohere, resulting in the development of a unitary mass or mass portions within the storage vessel which cause the formation of so-called "bridges" or "arches" in the central portion of the vessel, both in the lower and upper portion thereof. With such a formation, the normal free flowing, gravity-impelled discharge of the material is inhibited. Heretofore, in order to reduce or break up such a mass for the destruction of any bridge or arching formations, it has been requisite that individuals ascend the top of a vessel and then disrupt the mass while utilizing long rods or other agitating expedients introduced through an opening in the vessel wall for promoting free flow. Such operation must be repeated as frequently as discharge is undertaken. Thus, currently, only hand-operated devices have been used for destroying these flow-resistant formations.

Therefore, it is an object of the present invention to provide a storage vessel which incorporates a plurality of motor-driven revolving or orbiting worms or helicoids for disrupting any unified masses or bridges of stored material, and for maintaining same in a loosened state for free-flowing discharge.

It is a further object of the present invention to provide a storage vessel construction incorporating an orbiting or revolving worm or helicoid which extends upwardly within the storage vessel in the upper end thereof, for operation through stored material therein, thereby obviating the necessity of hand-operated devices presented from the exterior through openings in the vessel wall, and thus inherently preventing the undesired entry of air through such openings during such operations.

It is a further object of the present invention to provide a storage vessel incorporating means which will permit positive displacement and removal of the vessel contents from both the top and bottom thereof simultaneously.

It is a further object of the present invention to provide a storage vessel which is low-pressure, air-tight; with tapered sides from bottom to top so as to promote downward movement of stored material; and which incorporates a system for replacing the withdrawn material with a substantially inert gas to maintain the vessel interior in an oxygen-free condition.

It is an additional object of the present invention to provide a vessel which may be economically manufactured; which has a simplicity of parts and is, hence, resistant to breakdown and not subject to "down time" and which is reliable in usage.

Other objects and details of the invention will be apparent from the following description, when read in connection with the accompanying drawings (three sheets) wherein—

FIGURE 2 is a horizontal section taken along the line 2—2 of FIGURE 1.

FIGURE 3 is a vertical section taken along the line 3—3 of FIGURE 2

FIGURE 4 is an enlarged elevation of the area of connection between the vertical shaft and the upper and lower worms.

Figure 1:
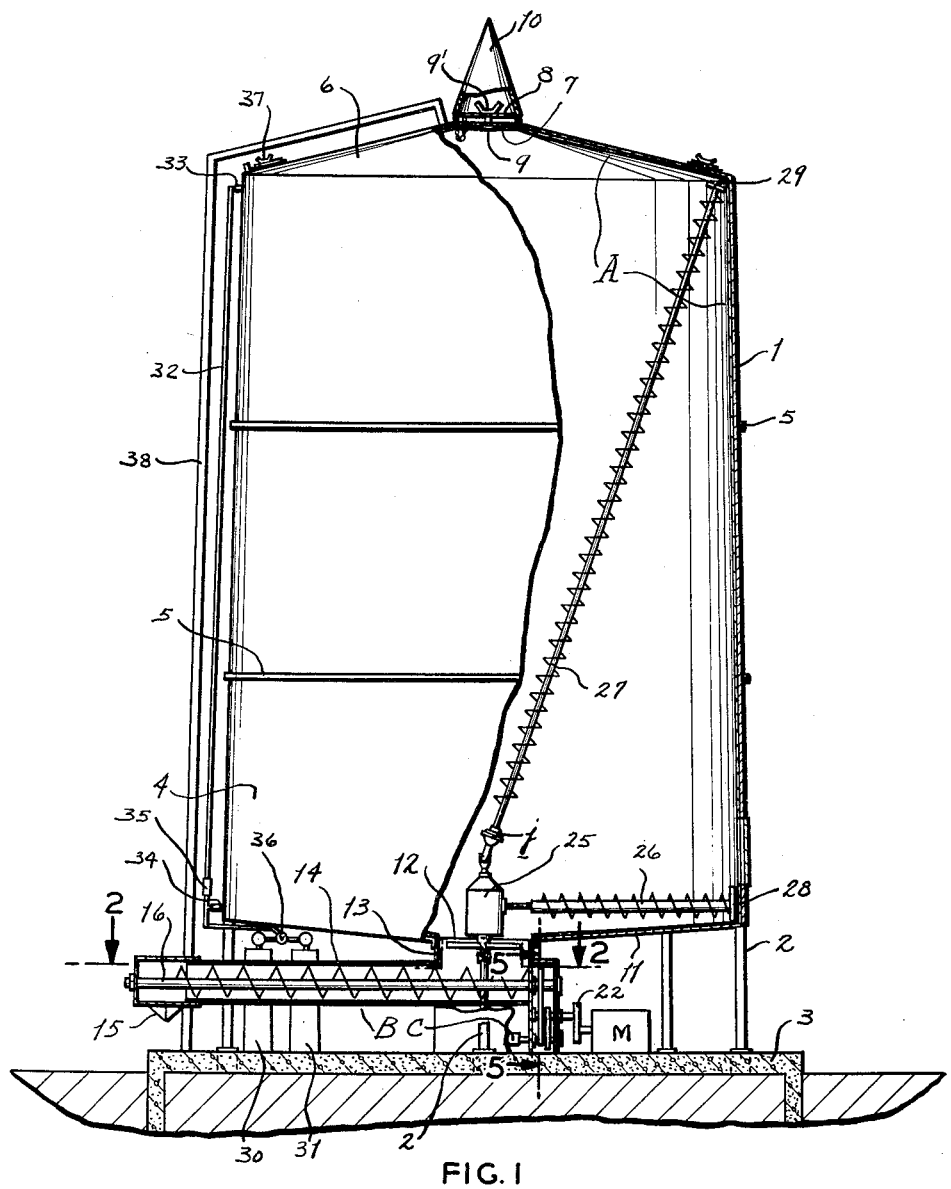
FIGURE 1 is a vertical elevation of a storage vessel constructed in accordance with and embodying the present invention, with parts of the same being broken away and sectioned.

Referring now by reference characters to the drawing which illustrates the preferred embodiment of the present invention, A designates a storage vessel which comprises a cylindrical shell 1 mounted at its lower end upon a plurality of circumferentially spaced uprights 2 which latter are suitably secured upon a foundation 3, such as of concrete; said foundation 3 extending into the ground to a proper depth. Shell 1, being formed of sheet metal, is constructed of a plurality of annular sections 4 which are secured together in an air-tight manner at the circumferential joints 5; said sections 4 being assembled one above the other and being of less diameter than the one immediately below so that vessel A tapers upwardly and inwardly, being thus of gradually decreasing diameter from bottom to top. The upper end of vessel A is closed by a top closure section 6 which at its apex is provided with an access opening 7 having a readily removable cover plate 8 secured in a leakproof, closed relation by a bolt 9 operable by a wing nut 9'. Disposed enclosingly of cover plate 8 is an easily displaceable conical cap 10 for assuring against accidental ingress of any foreign matter within vessel A.

Figure 5:
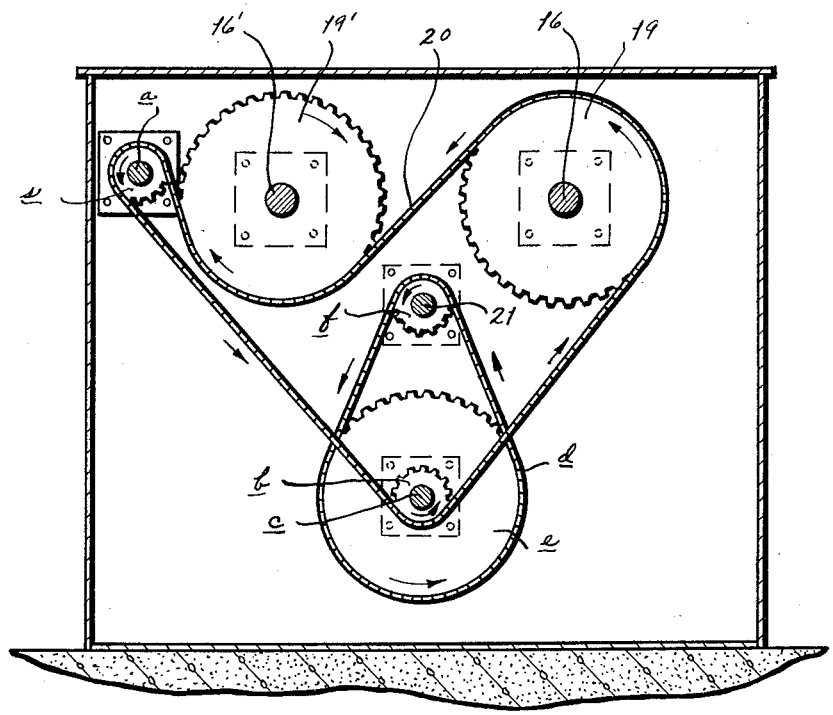
FIGURE 5 is a vertical transverse section taken on the line 5—5 of FIGURE 1.

Vessel A incorporates an annular base wall 11 which slopes downwardly and inwardly, at a relatively shallow angle to the horizontal, to an enlarged central opening 12 which latter communicates with the upper end of a short, cylindrical discharge chamber or hopper 13. The lower end of said chamber 13 is connected with the upper, inner end portion of a discharge conveyor B, comprising a horizontally disposed casing 14 extending outwardly beyond vessel A and having a downwardly opening outlet 15 at its outer end. Within casing 14 there is provided a pair of screw conveyors or feed screws 16, 16' being journaled at their ends within the end walls of said casing 14 and being in axially parallel, side by side, relationship. Each of said screw conveyors 16, 16' is disposed within a trough 17, 17', respectively, formed in a sheet metal partition member 18 fixed, as by welding, along its edges to the side walls of said casing 14 and extending longitudinally thereof, but terminating spacedly from the outlet 15 so that material delivered thereto may freely drop therethrough. At its normally inner end, each screw conveyor 16, 16' mounts a sprocket 19, 19', respectively, about which is trained, in an opposed manner, a chain 20, so that said conveyor 16, 16' will rotate in the same direction; said chain 20 being also led about a sprocket s carried on an idler shaft a and about a sprocket wheel b mounted on a clutch shaft c. Clutch shaft c is drivenly engaged to an input shaft 21 through a drive chain d and sprockets e, f, carried on said shafts, respectively, (see FIGURE 5). Shaft 21 is driven through a conventional belt-drive transmission, as broadly suggested at 22, by any suitable power source, such as a motor M disposed at a convenient point, as by mounting upon foundation 3. Shaft 21 is operably engageable through a conventional clutch, such as of the spiral saw type, mounted on clutch shaft c and beveled gear arrangement (not shown nor forming a part of the present invention), being broadly indicated at C, for effecting rotation of a vertical shaft 23, the lower end of which is suitably journaled in a bearing mounted on foundation 3 and which extends upwardly through an opening in partition member 18 for projection through discharge chamber 13; said shaft 23 being coaxial with vessel A.

Mounted on said shaft 23, within discharge chamber 13, for rotation therewith, is a plurality of radially extending, circumferentially spaced agitator or impeller blades 24, the outer ends of which terminate spacedly from the inner wall of said chamber 13; said blades 24 being disposed one above the other. At its upper end, immediately above chamber 13, said shaft 23 is engaged within a gear box 25 for connection through gearing (not shown) to a lower and an upper worm or helicoid 26, 27, respectively. Lower worm 26 extends radially from gear box 25, axially normal to vertical shaft 23, and at its outer end carries a supporting wheel 28 for movement about the outer edge portion of vessel base 11, in immediate adjacency to the inner wall of shell 1 so that as shaft 23 is rotated gear box 25 with worm 26 will be caused to rotate with the latter thus following a path substantially planarwise parallel to the horizontal.

At its upper end, verical shaft 23 is coupled by means of a universal joint *j* to the lower end of upper worm or helicoid 27 whereby the latter is rotated by operation of shaft 23, but due to joint *j* the same will generally orbit about the axis of rotation of said shaft. The particular joint shown in the drawing is merely exemplary of couplings of this character. There is no intention that this specific form be used. Furthermore, it is apparent that shaft 23 may be directly engaged to joint *j* or connected thereto by means of an intermediate shaft and gear arrangement in accordance with recognized practice. Upper worm or helicoid 27 extends upwardly within vessel A to the upper end of shell 1, immediately below closure section 6 and carries on its upper extremity a small, wall-engaging wheel 29 for facilitating movement of the upper end of said worm 27 along the inner wall of shell 1.

Provided for use with vessel A in order to maintain same in an oxygen-free condition to prevent spoilage and deterioration of the stored material, is a gas system comprising a source of gas, such as carbon dioxide, nitrogen, or other inert gases, under relatively low pressures, as stored in tanks 30, 31, which pressure is greater than the pressure within vessel A. Said tanks 30, 31 are in communication with the interior of vessel A by a main pipe 32 having upper and lower connections 33, 34, respectively, for gas discharge thereinto; a cut-off or control valve 35 being provided between said connections 33, 34 to permit selection thereof. A regulating valve 36 allows of pressure control between, tanks 30, 31.

There is also provided, preferably on closure section 6, a pressure relief valve 37 for automatic operation when the internal pressure of vessel A exceeds a predetermined point. In the drawings, 38 indicates a ladder, mounted upon vessel A, which will permit access to the upper end of said vessel for inspection purposes.

The internal walls of shell 1, including base wall 11 and the inner face of closure section 6 are suitably coated with a synthetic rubber lining material so as to render said walls non-corrosive as well as to increase the airtightness of the vessel so as to prevent the accidental inlet of any air which would have a deteriorating effect upon the stored material.

In actual use of vesesl A, with the same in a substantially filled state, as with feeds, grain, and the like, motor M is energized with shaft 21 put into operation and thereupon screw conveyors 16, 16' are caused to rotate. Immediately subsequent to actuation of shaft 21, clutch C is operated so as to engage shaft 23 with said motor to effect rotation of said shaft whereupon impeller blades 24 are caused to rotate within discharge chamber 13, lower worm 26 will be rotated for movement within its orbit at the lower end of shell A and upper worm 27 will be caused to move within its orbiting path. The said worms 26, 27 thus serve to disrupt or reduce any mass-formations which may have developed within the stored material, breaking any undesirable arching which may have inadvertently been brought about through the inherent cohesive character of the material so that the stored material may be moved by helicoid 27 for flow downwardly into discharge chamber or hopper 13 wherein the same will be subjected to the downward pressing action of impeller blades 24 for distributing same within said chamber for distribution to screw conveyors 16, 16'. The material so delivered is thus forced outwardly by said screw conveyors 16, 16' through casing 14 for discharge through outlet 15 and ultimate distribution. It will be noted that the impeller blades 24 also serve to break up any small clumps of material whereby the discharged material will be in its normal fine state. In passing, it should be noted that the utilization of clutch C prevents an undesirable load being placed upon drive transmission upon energization of shaft 21 and thus is conducive to conservation of the operating system.

As upper worm or helicoid 27 is coupled to vertical shaft 23 by universal joint *j*, the same is in a substantially free-floating state, as it may swing about its point of engagement and thus will reliably move through the material in the upper end of vessel A, destroying any bridge formations or the like which may have inadvertently developed subsequent to the previous vessel discharge operation. Thus, by action of the upper helicoid no undesirable masses can develop in the upper end of vessel A whereby the same will be free for movement and discharge. Similarly, lower worm 26 will reduce any bridge or mass formations which may have occurred in the lower portion of vessel A as well as effecting what might be termed a "scavenging action" about the inner wall of shell 1 so as to remove any support for mass formations thereabove. Additionally, for promoting the smooth downward flow of material, it will be noted that vessel A is of tapered construction so that the walls thereof will conduce to the downward descent of material, as the same, due to their taper, have a strong inhibiting effect upon bridge formation.

Thus, it will be seen that upon operation of this device, both worms 26, 27 will be constantly operating to assure positive displacement and removal of the stored material.

Furthermore, as the material is withdrawn from vessel A, gas from under pressure from tanks 30, 31 will be introduced into vessel A to replace the removed material; it being recognized that the choice of the use of connections 33, 34 will depend upon the quantity of material within vessel A. The gas is admitted to the vessel in sufficient volume to at least equal the volume of the silage removed and being devoid of free oxygen will prevent deterioration of the stored materials. It may be also recognized, of course, that gas may be admitted to vessel A from time to time without withdrawal of the stored material so as to make certain that vessel A is in a constant oxygen-free condition.

In view of the foregoing, it will be seen that vessel A incorporates novel means for preventing the development of "bridges" and is so uniquely designed as to assure at all times a smooth and high volume discharge of stored material. The simplicity of construction of vessel A renders the same, highly reliable and durable in operation and, thus, obviates the necessity of constant supervision and hand operated devices for promoting flow, as has heretofore been the custom.

It should be understood that changes and modifications in the formation, construction, arrangement, and combination of the several parts of the storage vessel construction may be made and substituted for those herein shown and described without departing from the nature and principle of my invention.

Having thus described my invention, what I claim and desire to secure by Letters Patent is:

1. A storage vessel for agricultural products comprising a generally cylindrical body having a base wall, a top wall, and a side wall, a discharge hopper provided at the lower end of said body communicating with the interior of the body through the base wall thereof, a vertical shaft disposed axially within said hopper and projecting into the interior of the cylindrical body, means for driving said shaft, a plurality of radially extending impeller blades provided on said shaft within said hopper, a plurality of conveyors provided at the lower end of said hopper in axial normal relationship to said shaft, a universal joint engaged to the upper end of said shaft, an elongated helicoid presented vertically with respect to said shaft for extension upwardly therefrom, the upper end of said helicoid terminating adjacent the upper end of said vessel body, and said upper end being free, the lower end of said helicoid being engaged to said universal joint whereby upon operation of said shaft said helicoid will rotate through a substantially conical path but may vary therefrom by virtue of its universal connection at its lower end and its free upper end, a second helicoid in substantially axially normal relationship to said shaft and being operably engaged thereto for rotation through a substantially horizontal path within said body, a roller member provided at the outer end of said second helicoid for supporting same on the base wall as it moves through its orbit of travel.

2. A storage vessel for agricultural products comprising a generally cylindrical body having a base wall and a top wall, a vertical shaft rotatable within the lower end of said body, means for driving said shaft, a first helicoid in substantial axial normal relationship to said shaft and being operably engaged to said shaft for rotation through a substantially horizontal path within said body, a roller member provided at the outer end of the lower rotatable member for supporting same on the base wall as it rotates, a second helicoid operably engaged to said shaft for extension upwardly from said shaft for rotation about a center coaxial with said shaft, said second helicoid terminating at its upper end adjacent the top wall of the body and said upper end of said second helicoid being free, and a plurality of impeller blades projecting radially from said vertical shaft beneath the first helicoid.

References Cited in the file of this patent
UNITED STATES PATENTS

| | | |
|---|---|---|
| 1,202,376 | Fraser | Oct. 24, 1916 |
| 2,540,975 | Webb | Feb. 6, 1951 |
| 2,551,216 | Martin | May 1, 1951 |
| 2,686,045 | Byberg | Aug. 10, 1954 |
| 2,914,198 | Hein | Nov. 24, 1959 |

FOREIGN PATENTS

| | | |
|---|---|---|
| 162,876 | Sweden | Apr. 8, 1958 |